United States Patent
Bergner

(10) Patent No.: US 12,420,497 B2
(45) Date of Patent: Sep. 23, 2025

(54) MOLDING OF FIBER BLANKS INTO THREE-DIMENSIONAL FIBER BLOCK ARTICLES

(71) Applicant: Inter IKEA Systems B.V., Delft (NL)

(72) Inventor: Anders Bergner, Halmstad (SE)

(73) Assignee: Inter IKEA Systems B.V., Delft (NL)

( * ) Notice: Subject to any disclaimer, the term of this patent is extended or adjusted under 35 U.S.C. 154(b) by 0 days.

(21) Appl. No.: 18/066,081

(22) Filed: Dec. 14, 2022

(65) Prior Publication Data

US 2023/0191723 A1 Jun. 22, 2023

Related U.S. Application Data

(63) Continuation of application No. 16/464,138, filed as application No. PCT/EP2017/080805 on Nov. 29, 2017, now Pat. No. 11,559,955.

(30) Foreign Application Priority Data

Nov. 30, 2016 (SE) .................................. 1651570-2

(51) Int. Cl.
*B29C 70/46* (2006.01)
*A47C 27/12* (2006.01)
(Continued)

(52) U.S. Cl.
CPC .............. *B29C 70/46* (2013.01); *A47C 27/12* (2013.01); *D04H 1/74* (2013.01); *B29K 2067/00* (2013.01); *B29K 2105/0863* (2013.01)

(58) Field of Classification Search
None
See application file for complete search history.

(56) References Cited

U.S. PATENT DOCUMENTS

| 5,183,708 A | 2/1993 | Yoshida et al. |
| 5,360,379 A | 11/1994 | Carelli et al. |

(Continued)

FOREIGN PATENT DOCUMENTS

| CA | 2957157 A | 3/2016 |
| CN | 101415354 A | 4/2009 |

(Continued)

OTHER PUBLICATIONS

International Search Report and Written Opinion for PCT/EP2017/080805 dated Feb. 20, 2018.

(Continued)

*Primary Examiner* — John J DeRusso
(74) *Attorney, Agent, or Firm* — Capitol City TechLaw

(57) ABSTRACT

A fiber block molding apparatus comprising: —a mold having a lower part and an upper part forming between them a cavity for forming a fiber blank into a fiber block article upon closing the mold; —a conveyor system for receiving the fiber blank to be molded at a receiving position, transporting the fiber blank via a heater for activation of a binding agent, and delivering the heated fiber blank into the lower part of the mold at a delivery end of the conveyor system, and —a horizontal position shifting arrangement for shifting the horizontal position of the delivery end of the conveyor system relative to the lower part of the mold between a first and a second position to lay the fiber blank on the lower part of the mold.

18 Claims, 10 Drawing Sheets

(51) Int. Cl.
*B29K 67/00* (2006.01)
*B29K 105/08* (2006.01)
*D04H 1/74* (2006.01)

(56) References Cited

U.S. PATENT DOCUMENTS

| | | | |
|---|---|---|---|
| 6,033,607 | A | 3/2000 | Kataoka et al. |
| 6,171,419 | B1 | 1/2001 | Heiman et al. |
| 6,749,794 | B2 | 6/2004 | Spengler |
| 8,484,940 | B2 | 7/2013 | Bruner |
| 2004/0094391 | A1 | 5/2004 | Schaum et al. |
| 2005/0140059 | A1 | 6/2005 | Ernst et al. |
| 2005/0263345 | A1* | 12/2005 | Erickson ............ B60R 13/0815 181/290 |
| 2009/0273222 | A1 | 11/2009 | Takei et al. |
| 2011/0084425 | A1 | 4/2011 | Yamamoto |
| 2012/0328846 | A1 | 12/2012 | Blot et al. |
| 2015/0375444 | A1 | 12/2015 | Bamford et al. |
| 2016/0297113 | A1 | 10/2016 | Burke et al. |

FOREIGN PATENT DOCUMENTS

| | | | |
|---|---|---|---|
| CN | 102596547 | A | 7/2012 |
| CN | 103159987 | A | 6/2013 |
| CN | 106042421 | A | 10/2016 |
| DE | 102014109174 | A1 | 1/2016 |
| EP | 0473422 | A1 | 3/1992 |
| EP | 0588017 | A1 | 3/1994 |
| EP | 2008548 | A1 | 12/2008 |
| FR | 987942 | A | 8/1951 |
| GB | 2433696 | A * | 7/2007 ........... A47C 31/007 |
| JP | 5981123 | A | 5/1984 |
| JP | 07-021312 | U | 4/1995 |
| JP | 07-045133 | B2 | 5/1995 |
| JP | 11131398 | A | 5/1999 |
| JP | 2001-507763 | A | 6/2001 |
| JP | 2003-117992 | A | 4/2003 |
| WO | 198801565 | A1 | 3/1988 |
| WO | 199857796 | A1 | 12/1998 |
| WO | 2007058937 | A2 | 5/2007 |
| WO | 2009036240 | A1 | 3/2009 |
| WO | 2009099360 | A1 | 8/2009 |

OTHER PUBLICATIONS

International Preliminary Report on Patentability for PCT/EP2017/080805 dated Mar. 4, 2019.

Office Action issued by EPO for corresponding European Application No. 20214256.8 on May 16, 2023.

* cited by examiner

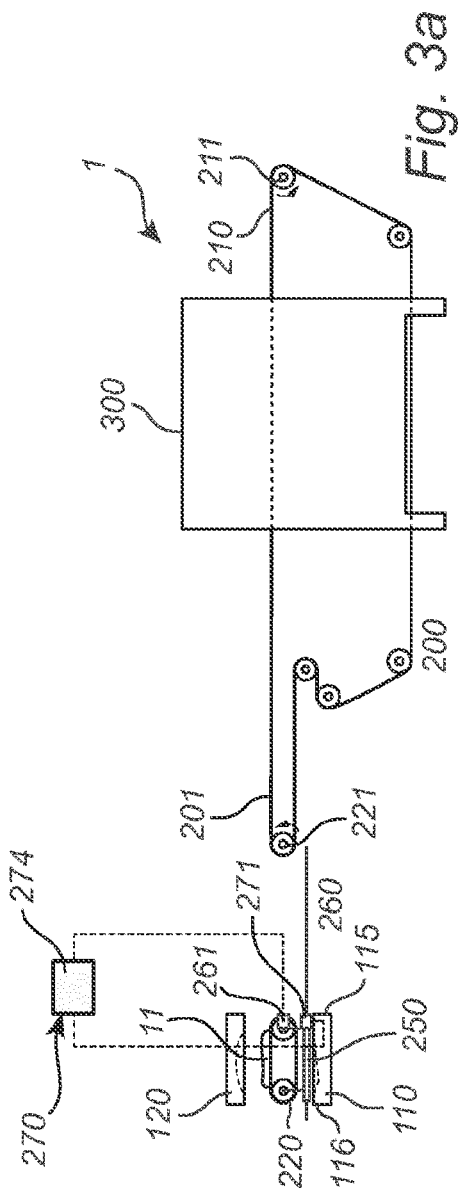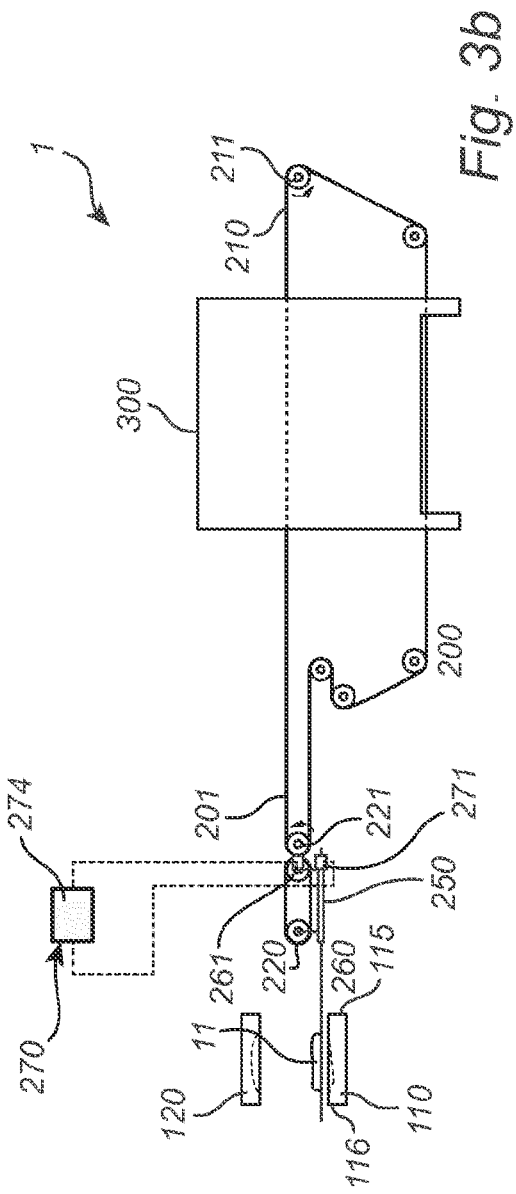

MOLDING OF FIBER BLANKS INTO THREE-DIMENSIONAL FIBER BLOCK ARTICLES

This application is a Continuation of U.S. application Ser. No. 16/464,138, filed May 24, 2019, which is a national phase of International Application No. PCT/EP2017/080805 filed Nov. 29, 2017 and published in the English language, which claims priority to Swedish Application No. 1651570-2 filed Nov. 30, 2016, all of which are hereby incorporated by reference.

FIELD OF THE INVENTION

The present invention relates to fiber block molding apparatus for molding a fiber blank, such as non-woven fiber bat, comprising a thermally activated binding agent, e.g. bi-component binder fiber, into a three-dimensional fiber block article. Further, it relates to a corresponding process.

BACKGROUND

Molded cushion members are used in furniture to provide resilient properties and comfort. As an example, cushion members may be used in the seat of chairs and sofas as well as in the back rest. Urethane foam has been used in such cushion members. However, urethane foam suffers from generating toxic gas upon combustion. Further, recycling of urethane foam is difficult.

As alternative to urethane foam in cushion members, molded fiber mixtures including a thermally activated binding agent, e.g. melt binder fibers, have been used in the art. In U.S. Pat. No. 6,033,607, a process for filling a fiber mixture into a mold cavity and subsequent heating it therein to provide a molded cushion member is disclosed. The disclosed process results in random fiber orientation within the cushion member. Thus the resilient properties are approximately the same in any given direction within the cushion member.

In other applications (e.g. US 2005/0140059), fiber bats, e.g. carded fiber webs, with a pre-defined fiber orientation has been positioned in molds and molded into a resilient cushion member. In the resulting cushion member, the resilient properties will differ within the cushion member depending on the fiber orientation. This may be of interest in providing cushion members for chairs and sofas. However, fiber blanks with pre-defined fiber orientation suffer from lower mechanical resistance in some directions, e.g. perpendicular to the fiber orientation, posing limitations in positioning the fiber blank into the mold.

Regardless the molding technique used, it is of interest to keep the residence time in the mold low and to have flexibility in handling the fiber blank, whereas still providing the desired mechanic and resilient properties to the cushion member. Generally, the cycle time should be as low as possible in order to allow for efficient manufacturing. Further, the resilient properties in a direction perpendicular to the extension of the cushion member, i.e., in the load direction of the cushion member, should preferably be as high as possible in to provide comfort.

In EP 473 422 an apparatus for continuously producing fiber reinforced mold charge blanks for molding processes is disclosed. The apparatus comprises a shuttle assembly for transferring the mold charge blanks from the oven conveyor to a press. The apparatus is for pressing, i.e. preforming, a reinforcing member to provide a fiber reinforced mold charge blank to be impregnated with a liquid resin in providing a composite structure. The fiber reinforced mold charge blanks are positioned in the press by scraping them off from the shuttle assembly. Such a process is not suitable for handling and molding fiber blanks in which the fibers are arranged perpendicularly to the longitudinal extension of the fiber blank and to the transport direction in the process, as such a fiber blanks are very labile.

Thus, there is need for an efficient fiber block molding apparatus and process for providing molded cushion member, comprising thermally activated binding agent, with good resilient properties.

SUMMARY

Consequently, the present invention seeks to provide an efficient apparatus and process for molding a fiber blank comprising a thermally activated binding agent into a three-dimensional fiber block article.

According to a first aspect of the invention there is provided a fiber block molding apparatus for molding a three-dimensional fiber block article from a heated fiber blank comprising a thermally activated binding agent. The fiber block article is a typically molded three-dimensional fiber block article being resilient. Such resilient three-dimensional fiber block articles are useful as comfort filings in furniture applications, e.g. as cushion members in seats and/or back rest of sofas and chairs. Preferably, the fibers in the fiber block article are arranged perpendicularly to its longitudinal extension.

The apparatus comprises a mold. The mold has a lower part and an upper part. Between them the lower and the upper parts of the mold form a cavity for forming the fiber blank into the molded fiber block article upon closing the mold. Preferably, at least one of parts of the mold is provided by cooling means to allow for rapid cooling of the molded fiber block article and thereby shorten the residence time in the mold. Further, the surface of the molded fiber block article may be provided with special properties by rapid cooling thereof. By rapid cooling, improved consistency in surface properties as well as in the 3-dimensional shape of the molded fiber block article may be provided. Further, rapid cooling allows for tailored geometry and/or surface pattern. Thus, the lower and/or the upper part of the mold may be provided with channels for a cooling fluid, such as water or air. Further, at least one of the parts of the mold, such as the upper part, may be a shaped perforated plate or a shaped rigid net, with high permeability to fluids, e.g. air, to allow for rapid cooling of the molded fiber block article. If one of the parts of the mold is a perforated plate or a rigid net, a cooling fluid may be provided from the other part of the mold to the molded fiber block article and released through the permeable part of the mold. If both the parts of the mold are perforated plates or a rigid net, cooling fluid, such as air, may be pushed through the mold and the molded fiber block article, such as by means of a fan, to cool the molded fiber block article.

According to an embodiment the lower part of the mold is provided with a first set of channels for a cooling fluid; alternatively the upper part of the mold is provided with a second set of channels for a cooling fluid. Preferably, the lower part of the mold is provided with a first set of channels and the upper part of the mold is provided with a second set of channels. By providing the mold with channels for a cooling fluid, e.g. air or water, the temperature of the mold may be controlled and kept low by passing a cooling fluid through the channels, whereby the molded fiber block article may be rapidly cooled once molded.

In order to allow for rapid cooling not only of the surface of the molded article but also of its interior, the set(s) of channels may be in flow communication with the cavity of the mold, whereby the cooling fluid may flow through the molded fiber block article to cool it, as the molded fiber block article is permeable due its fibrous nature. Further, the mold may be provided with connection ports serving as inlet and outlet, respectively, for the cooling fluid. The connection ports are in flow communication with the set(s) of channel (s). According to one embodiment both the lower and the upper part are provided with connection ports. According to such an embodiment the cooling fluid may flow from one part of the mold to the other via the cavity of the mold. According to an embodiment wherein only one of the parts of the mold, be it the lower or the upper part, comprises a set of channels, the part may be provided with at least two connection ports; one serving as inlet and the other as outlet for the cooling fluid.

In embodiments wherein the cooling fluid is to flow through the cavity of the mold and the molded fiber block article present therein, the cooling fluid may be air. While also a liquid cooling fluid, such as water may be used, use of a liquid cooling fluid will leave a residue in the molded fiber block article. A process leaving a liquid residue in the molded fiber block article demands a separate drying step, effecting the overall process economy and cycle time negatively.

In an embodiment wherein the cooling fluid is to flow through the cavity of the mold, the part(s) of the mold may be provided with another set of channels for a liquid. This other set of channels is not in flow communication with the cavity. By providing the part(s) of the mold with additional cooling, the surface of the molded fiber block article may be rapidly cooled to solidify. Further, by providing a set of channels for a cooling liquid, the temperature of the mold and its surfaces may be kept constant throughout the molding cycle. Depending on the type of bonding agent of the fiber blank (e.g. the type of bonding agent influencing the melting temperature of the core-sheath and bi-component fibers), the bonding strength at the surface of the molded fiber block article may be adjusted depending on the surface temperature of the mold. A too low temperature of the mold may result in that the surface of the fiber blank solidifies even before the mold has been closed, being less preferred. Preferably, relevant parameters, such as the temperature of the mold, the cycle time, and the temperature of the heated fiber blank, are controlled to provide the surface of the molded fiber block article with the desired properties. In some embodiments, the temperature of the mold and its surfaces is in the range of 20 to 65° C., such as 30 to 60° C., or even in the interval 35 to 45° C., e.g. about 40° C. According to an embodiment in which the lower part of the mold is provided with a first set of channels for a cooling fluid, the first set of channels may comprise a first number of channels arranged in the plane of the lower part of the mold. The first number of channels may be arranged between a second number of channels and a connection port. The second number of channels may be arranged perpendicular to the plane of the lower part of the mold and running into the cavity. The first set of channels may be provided by drilling a first number of channels in the plane of the lower part of the mold. By drilling a second number of channels perpendicular to the plane of the lower part of the mold from the cavity into the first number of channels, the second number of channels in flow communication with the cavity of the mold and the first number of channels may be provided. The cooling fluid may flow from the connection port, via the first number of channels to the second number of channels and thereafter into the cavity, or in the opposite direction. Preferably, the diameter of the orifices of the second number of channels running into the cavity is smaller than the diameter of the rest of the channels. Having orifices with smaller diameter will serve as a throttling, leveling the pressure and flow rate within each channel.

According to an embodiment in which the upper part of the mold is provided with a second set of channels for a cooling fluid, the second set of channels may comprise a third number of channels arranged in the plane of the lower part of the mold. The third number of channels may be arranged between a fourth number of channels and a connection port. The fourth number of channels may be arranged perpendicular to the plane of the lower part of the mold and running into the cavity. The third number of channels may be provided by drilling a number of channels in the plane of the upper part of the mold. By drilling a number of channels perpendicular to the plane of the upper part of the mold from the cavity into the third number of channels, the forth number of channels in flow communication with the cavity of the mold and the third number of channels may be provided. The cooling fluid may flow from the connection port, via the third number of channels to the fourth number of channels and thereafter into the cavity, or in the opposite direction. Preferably, the diameter of the orifices of the fourth number of channels running into the cavity is smaller than the diameter of the rest of the channels. Having orifices with smaller diameter will serve as a throttling, leveling the pressure and flow rate within each channel.

In embodiments wherein both the lower and the upper part of mold are provided with channels running into the cavity, the orifices of channels in the lower part running into the cavity may be displaced, i.e. not being aligned, with respect to orifices of channels in the upper part running into the cavity. By displacing the orifices in relation to each other, the cooling fluid may more efficiently be distributed throughout the molded fiber block article.

The shape of the cavity of the mold is defined by the upper and lower part. In order to allow for efficiently changing the shape of the cavity and the resulting fiber block article without having to changing the entire mold, the lower part of the mold may comprises a main part and a replaceable insert part. The insert part may be provided with a surface structure, such as an indentation, defining the lower part of the cavity. Similarly, the upper part of the mold may comprise a main part and a replaceable insert part. The insert part may be provided with a surface structure, such as an indentation, defining the upper part of the cavity. By providing the mold with replaceable insert parts, only the replaceable insert parts needs to be changed in changing the shape of the cavity. In embodiments, wherein the mold are provided with a first to a fourth number of channels as described above, the first and third number of channels may be present in the lower and upper main part, respectively, whereas the second and fourth number of channels may extend from lower and upper main part, respectively, and into the lower and upper replaceable insert part, respectively.

The lower part and the upper part of the mold are vertically movable relative to each other to close the mold. Thus, the mold may be closed by lowering the upper part and/or raising the lower part of the mold. According to an embodiment, the mold is closed by lowering the upper part of the mold to bring it into contact with the lower part of the mold, keeping the lower part of the mold in its original vertical position.

Further, the fiber block molding apparatus comprises a heater for heating the fiber blank before molding it to activate the binding agent. By heating the fiber blank, the binding agent, such as the sheath of a core-sheath binder, melts and thereby becomes activated. After having molded the heated fiber blank into the desired shape and cooled it, the three-dimensional fiber block article will maintain its shape as the fibers are bonded together by the binding agent, whereby a three-dimensional fiber block article is provided starting from a fiber blank. By separating the heating and cooling step, the cycle time may be significantly reduced. Repeatedly heating and cooling the mold is time consuming. However, as further discussed below, the heated fiber blank has very low tensile strength and special means for positioning it in the mold are thus used.

The heater is typically an oven through which the fiber blank is passed in order to heat it.

In order to effectively heat the fiber blank, the heater may be arranged for pushing heated air through the fiber blank. Heated air may be pushed through the fiber blank in various manners. As example, the heater may be provided with fans for pushing heated air through the fiber blank. Further, the heater may be provided with fans for sucking heated air through the fiber blank. The fiber blank is typically transported through the oven by means of a conveyor system comprising a conveyor belt. In order to facilitate the pushing of heated air through the fiber blank, the conveyor belt may be permeable such that the heated air may be pushed through the fiber blank and the conveyor belt. One example of a preferred permeable conveyor belt is a belt comprising a supporting aromatic polyamide scrim, e.g. a Kevlar, Twaron, Technora, Kermel, Nomex, or Teijinconex scrim, coated with a fluoropolymer, e.g. polytetrafluoroethylene.

Once heated, the fiber blank is to be transported to the mold. The fiber block molding apparatus thus further comprises a conveyor system. The conveyor system is arranged for receiving the fiber blank to be molded at a receiving position, for transporting the fiber blank via the heater for activation of the binding agent, and for delivering the heated fiber blank directly into the lower part of the mold, by feeding it thereto. As already mentioned, the conveyor system may comprise a conveyor belt. Though the conveyor belt may be permeable, e.g. perforated, it is still continuous not only in the transport direction, but also perpendicular thereto. Typically, the heater, e.g. an oven, is positioned between a receiving end and a delivery end of the conveyor system. The fiber blank is positioned at the receiving position, transported via the heater to finally arrive at the delivery end located next to the mold to which the heated fiber blank is to be delivered. The delivery end is thus arranged at the opposite side of the heater relative the receiving position. Further, the delivery end is arranged on a vertically higher level than the lower part of the mold, such that the heated fiber blank gravimetrically may be positioned into the lower part of the mold once leaving the conveyor system.

Once heated, the heated fiber blank is very soft with low tensile strength; especially if the fiber blank is a lapped vertically, such that the fibers in the fiber blank are arranged "standing", i.e. perpendicularly to the longitudinal extension of the fiber blank (cf. V-lap or Struto arrangement of fibers). Typically, such an arrangement means that the fibers in the fiber blank are arranged in a direction being perpendicular to the transport direction. As standing fibers will provide superior resilient properties to a cushion member compared to laying fibers (cf. cross-laid non-woven), it is of importance to be able to deliver the heated fiber blank in a careful manner to the lower part of the mold. Thus, the conveyor system is provided with a horizontal position shifting arrangement.

The horizontal position shifting arrangement allows for shifting the horizontal position of the delivery end of the conveyor system relative to the lower part of the mold between a first and a second position whilst at the same time laying the heated fiber blank onto the lower part of the mold. In the first position, the delivery end of the conveyor system is located between the distal end and the proximal end of the lower part of the mold. Preferably, the delivery end of the conveyor system is located closer to the distal end than to the proximal end of the lower part of the mold in the first position. A heated fiber blank arriving at the delivery end of the conveyor system is thus positioned over the lower part of the mold to which it is to be delivered. In the second position, the delivery end of the conveyor system is located closer to the proximal end than to the distal end of the lower part of the mold, but not between the proximal end and the distal end. Thus, the conveyor system is not positioned over the surface structure, such as the indentation, of the lower part of the mold defining the lower part of the cavity in the second position. Once positioned in the second position, the mold may be closed as the conveyor system has been withdrawn.

By co-coordinating the feeding of the heated fiber blank by the conveyor system and the shifting of the position of the delivery end, heated fiber blank may be laid on the lower part of the mold, i.e. the heated fiber blank may be placed on the lower part of the mold with a very low mechanical impact being inflicted on the heated fiber blank. Preferably, the feeding rate and the shifting rate are essentially the same, such that the heated fiber blank neither is stretched nor compressed in being laid on the lower part of the mold. However, in some embodiments the feeding rate is slightly higher that the shifting rate such that the heated fiber blank is compressed in being laid on the lower part of the mold. Compressing the heated fiber blank slightly may improve the resilient properties somewhat. Thus, the conveyor system comprises a fiber blank laying arrangement, arranged to release the heated fiber blank from the conveyor system at the delivery end in co-ordination with the horizontal position shifting arrangement shifting the position of the delivery end from the first position to the second position, such that the heated fiber blank may be laid on the lower part.

Typically, the conveyor system comprises a conveyor belt turning over a first turning shaft at the delivery end of the conveyor system. Further, the conveyor system typically comprises a second turning shaft at the receiving end of the conveyor system. The delivery end and receiving end of the conveyor system constitute opposing ends of the conveyor system. Further, the conveyor system may comprise additional shafts for the conveyor belt, such as a stretching shaft for keeping the conveyor belt stretched. The conveyor system further comprises a driving shaft to operate the conveyor belt.

According to an embodiment the conveyor system comprises a conveyor belt turning over a first turning shaft at the delivery end of the conveyor system and a stretching shaft. The stretching shaft may be arranged between the delivery end and the heater. It serves to keep the conveyor belt stretched. According to such an embodiment, the horizontal position of the delivery end relative the conveyor system is shifted by the horizontal position shifting arrangement by displacing the first turning shaft horizontally whilst feeding the heated fiber blank to the lower part of the mold to lay it thereon. The conveyor belt is kept stretched by displacing the stretching shaft in co-ordination with the displacement of the first turning shaft.

According to an alternative embodiment the conveyor system comprises a conveyor belt turning over a first turning shaft at the delivery end and over a second turning shaft at a receiving end of the conveyor system. According to such an embodiment, the horizontal position of the delivery end is shifted by the horizontal position shifting arrangement by the latter being arranged for displacing the first turning shaft horizontally whilst feeding the heated fiber blank to the lower part of the mold to lay it thereon. The conveyor belt is kept stretched by displacing the second turning shaft in co-ordination with the displacement of the first turning shaft. Displacing the first turning shaft horizontally may include displacing the entire conveyor system relative the mold. This may be accomplished by mounting the conveyor system on trolley carriage. Also the heater may be mounted on the trolley carriage. Alternatively, the first and second turning shaft may be displaced relative the conveyor system.

According to an alternative embodiment the conveyor system comprises a conveyor belt for receiving, at the receiving position, the fiber blank to be molded, and transporting the fiber blank via the heater to a conveyor belt end. Further, the conveyor system comprises a conveyor shuttle separate from the conveyor belt and comprising the delivery end of the conveyor system. The conveyor shuttle is arranged for receiving the heated fiber blank from the conveyor belt at the conveyor belt end and for subsequently feeding it to the lower part of the mold. According to such an embodiment, the horizontal position of the delivery end is shifted, from the aforementioned first position to the aforementioned second position, by the horizontal position shifting arrangement by displacing the conveyor shuttle horizontally, whilst feeding the heated fiber blank to the lower part of the mold to lay it thereon.

According to yet an alternative embodiment, the shifting of the horizontal position of the delivery end of the conveyor system relative to the lower part of the mold is accomplished by displacing the lower part of the mold whilst feeding the heated fiber blank to the lower part of the mold to lay it thereon. Thus, the horizontal position shifting arrangement shifts the lower part of the mold from a first position to a second position in operating the fiber block molding apparatus. In the first position, the lower part of the mold is positioned such that the delivery end of the conveyor system is arranged between the distal end and the proximal end of the lower part of the mold. Preferably, the lower part of the mold is positioned such that the delivery end of the conveyor system is located closer to the distal end than to the proximal end of the lower part of the mold in the first position. In the second position, the delivery end of the conveyor system is arranged closer to the proximal end than to the distal end of the lower part of the mold, but not between the proximal end and the distal end. Furthermore, in the second position the lower part of the mold may be vertically aligned with the upper part of the mold. Especially in an embodiment, wherein the horizontal position of the lower part of the mold is to be shifted, it is preferred if the mold is closed by lowering the upper part of the mold.

According to a second aspect of the invention there is provided a fiber block molding process for molding a heated three-dimensional fiber block article from a fiber blank comprising a thermally activated binding agent. In describing the fiber block molding apparatus herein above, aspects relating to the operation thereof have been included. Such aspects are equally applicable in relation to the fiber block molding process described herein below as well.

The fiber block molding process for molding a fiber blank comprising the steps of:
receiving a fiber blank to be molded into a three-dimensional fiber block article at a receiving position of a conveyor system;
transporting the fiber blank by means of the conveyor system via a heater, thereby heating the fiber blank to activate the binding agent, to a mold for molding the heated fiber blank;
laying the heated fiber blank on the lower part of a mold; and
closing the mold to provide the three-dimensional fiber block article.

The receiving position of a conveyor system is typically located between a receiving end of the conveyor system and the heater, a delivery end of the conveyor system being located at the opposite side of the heater. As already described, the conveyor system typically comprises a conveyor belt. The fiber blank, such as a fiber blank in form of a sheet, is placed on the conveyor belt at the receiving position. The placement can be made by a pick-and-place robot. A supply of fiber blanks may be provided on a roll to be cut into sheets for being positioned on the conveyor belt.

The fiber blank comprises a thermally activated binding agent and fibers. The fibers in the fiber blank may include polyester fibers. Examples of polyester fibers include PET (polyethylene terephthalate) fibers, PBT (polybutylene terephthalate) fibers, PTT (polytrimethylene terephthalate) fibers, PLA (polylactic acid) fibers, and PEF (polyethylene furanoate) fibers. The fibers can also be made of other polymers, i.e. PA (Polyamide) or PP (Polypropylene), as well as combinations and co-polymers of any suitable polymer. The fibers in the fiber blank also may comprise cellulosic based fibers, e.g. Viskos, Modal, Lyocel, Tencel, or Danufill fibers, for improved moisture management or modified fire behavior. Further, higher performing fibers may be present in the fiber blank. Examples of higher performing fibers providing fire retarding properties include inherently flame retardant PET (Trevira CS), meta-aramide (i.e. Nomex), carbon/carbonised fibers (i.e. Panox), or any other high performing fiber with high melting or decomposition temperature and/or high LOI (Limiting Oxygen Index).

In activating the binding agent the temperature should not completely melt the fibers in the fiber blank, resulting in the fiber blank collapsing into a film. The temperature in the heater should thus be lower than the melting point of the fibers, e.g. polyester fibers, in the fiber blank. Further, the temperature in the heater should be higher than the activation temperature, e.g. melting point, of the binding agent. Typically, the melting point temperature may be 100 to 160° C. For polyester fibers, the temperature used in the heater may be 120 to 220° C. In order to provide specific properties, such as low melting point for thermal bonding, improved fire retardant properties, increased elasticity and recovery after deformation etc. the polyester may be a co-polymer, such as block co-polymer. As an example, a block co-polymer comprising polyester and polyolefin blocks have lower melting point compared to the corresponding polyester. Further, the polyester compound may comprise additives and/or additional polymers to provide the compound with specific properties.

The fiber blank may comprise binder fibers and filling fibers. The filling fibers provide resilience. They may be conjugated fibers with spiral crimp, mechanically crimped fibers, non-crimped fibers, or a mix thereof. Further, there may be fibers of high crystallinity having high Tg.

The fiber blank may comprise bi-component binder polyester fibers, e.g. core-sheath binder fibers or side-by-side binder fibers. As known in the art, bi-component fibers are fibers comprising two polymers of different chemical and/or physical properties. Bi-component binder fibers are bi-component fibers having a binder portion with lower melting point than that of the other portion. In core-sheath binder fibers the sheath has lower melting point than the core. Core-sheath binder fibers have the advantage of having good binding properties, as the binder portion, i.e. the sheath, surround the entire fiber, thereby maximizing the contact surface with other fibers in the blank.

In embodiments wherein the fiber blank comprises bi-component binder polyester fibers, the fiber blank may comprise 10 to 80 wt %, such as 20 to 60 wt %, bi-component binder polyester fibers. The bi-component binder polyester fibers may be core-sheath binder polyester fibers wherein the sheath may constitute the thermally activated binding agent.

Examples of binder fibers include urethane elastomer modified polyester (such fibers preferably constitute more than 40 wt % of the fiber content in the fiber blank), e.g. Teijin ELK, crystalline co-polyester fibers, e.g. Wellman M1439, (such fibers preferably constitute 30 to 40 wt % of the fiber content in the fiber blank), and standard amorphous co-polyester (such fibers preferably constitute up to 30 wt % of the fiber content in the fiber blank).

Fibers of PET based polyester, or copolymers, thereof have a melting point of more than 200° C., e.g. about 260° C. Similarly, also the melting point of the core of the core-sheath PET based polyester binder fibers is higher than 200° C., e.g. about 260° C. Further, the sheath of the core-sheath polyester binder fibers have a melting point of less than 200° C., e.g. about 110° C. However, some other type of binder fibers, e.g. amorphous fibres, crystalline and ELK, have a higher activation temperature of up to 160° C. The melting point of the polyester sheath may be lowered by co-polymerization with olefin groups, reducing the melting point significantly, e.g. to about 110° C. Preferably, the melting point of the sheath of the core-sheath polyester binder fiber is at least 50° C. lower, such as at least 75° C. lower, or even at least 100° C. lower, than the melting point of the core. Similarly, the melting point of the sheath of the core-sheath polyester binder fiber is at least 50° C. lower, such as at least 75° C. lower or even at least 100° C. lower, than the melting point of the fibers of polyester, or copolymers thereof.

The fibers in the fiber blank and the proportion of various types of fibers will affect the resilient properties of the resulting three-dimensional fiber block article. Further, the fiber orientation in the fiber blank will affect its resilient properties. According to an embodiment the fiber blank is a lapped vertically and the fibers in the fiber blank are thus arranged perpendicularly to the extension of the fiber blank. In this context the "extension of the fiber blank" will be considered to be a direction which is perpendicular to the main load direction of the fiber block article to be molded. For example if the fiber block article is a seat cushion for a chair, then the "extension of the fiber blank" is the horizontal direction, which is perpendicular to the vertical direction of the load exerted by a person sitting on the seat cushion. Compared to laying fibers, such as in a cross-lapped fiber blank, standing fibers will provide improved resilient properties.

Once positioned on the conveyor system, the conveyor system transports the fiber blank to the mold. The mold has a lower part and an upper part forming a cavity between them when closing the mold. Upon being transported, the fiber blank passes the heater, e.g. through an oven, to be heated thereby activating the binding agent. The heater may push heated air through the fiber blank in order to effectively heat it. The heated air may be pushed upwards through the fiber blank, thereby lowering the risk for deforming the fiber blank (an upward airflow affects the material in direction different from the one of gravitation). The temperature of the heated air is above the activation temperature, e.g. the melting point, of the binding agent. Further, the temperature of the heated air is below the melting point of filling fibers as well as below the melting point of the core of bi-component binder fibers. The heated air may for example have a temperature of 120 to 220° C., such as 120 to 190° C. or even 150 to 190° C. According to a preferred embodiment the temperature of the heated air is 150° C. or higher, more preferably 160° C. or higher, or even 180° C. or higher. Further, the temperature of the heated air is, according to a preferred embodiment, 215° C. or lower, more preferably 210° C.

As already explained, the heated fiber blank has a low tensile strength. Thus, it could not be positioned in the mold using e.g. pick-and-place robot, as a gentle delivery process is required. However, there is still need for an efficient delivery process in order to keep the cycle time low.

The conveyor system is thus arranged to lay the heated fiber blank on the lower part of the mold avoiding substantial tensile stress along the extension of the blank. In order to lay the heated fiber blank on the lower part of the mold the delivery end of the conveyor system is arranged on a vertically higher level than the lower part of the mold in laying the heated fiber blank on the lower part of the mold, whereby the heated fiber blank may be dropped into the mold affected by the gravitation. However, simply dropping or scraping off the heated fiber blank will distort the fiber blank. The horizontal position of the delivery end of the conveyor system relative the lower part of the mold is thus shifted whilst feeding the heated fiber blank to the lower part of the mold to lay it thereon. The horizontal position of the delivery end of the conveyor system relative the lower part of the mold is shifted from a first position to a second position in delivering the heated fiber blank to the lower part of the mold. As already described in relation to the present apparatus, the feeding is coordinated with the shifting from the first to the second position such that the heated fiber blank is laid on the lower part of the mold. In the first position, the delivery end of the conveyor is arranged between the distal end and the proximal end of the lower part of the mold. Preferably, the delivery end of the conveyor is arranged closer to the distal end than to the proximal end of the lower part of the mold in the first position. In the second position, the delivery end of the conveyor is arranged closer to the proximal end than to the distal end of the lower part of the mold, but not between the proximal end and the distal end. Hence, moving the horizontal position of the delivery end from the first position to the second position simultaneously with releasing the heated fiber block from the conveyor results in a gentle placement of the heated fiber block on the lower part of the mold.

By co-coordinating the feeding of the heated fiber blank by the conveyor system and the shifting of the position of the delivery end, a heated fiber blank may be laid on the lower part of the mold, i.e. the heated fiber blank may be placed on the lower part of the mold with a very low mechanical impact being inflicted on the heated fiber blank. Preferably, the feeding rate and the shifting rate are essentially the same, such that the heated fiber blank neither is stretched nor compressed in being laid on the lower part of the mold. However, in some embodiments the feeding rate is slightly higher than the shifting rate such that the heated fiber blank is slightly compressed in conjunction with being laid on the lower part of the mold. Compressing the heated fiber blank slightly may improve the resilient properties somewhat.

According to an embodiment, the horizontal position of the delivery end of the conveyor system relative the horizontal position of the lower part of the mold is shifted by horizontally shifting the delivery end of the conveyor system.

Once the mold has been closed, the molded fiber block article may be cooled by pushing a cooling fluid, such as cooling air, through it once the mold has been closed. Further aspects of cooling the molded fiber block article has already been disclosed herein above.

BRIEF DESCRIPTION OF THE DRAWINGS

These and other aspects, features and advantages of which the invention is capable of will be apparent and elucidated from the following description of embodiments of the present invention, reference being made to the accompanying drawings, in which:

FIG. 3*a-b* depicts a cross-section a of fiber block molding apparatus according to an embodiment;

DETAILED DESCRIPTION

The following description focuses on embodiments of the present invention applicable to fiber block molding process for molding a fiber blank 10, comprising a thermally activated binding agent, into a three-dimensional fiber block article and to a fiber block molding apparatus 1. However, it will be appreciated that the invention is not limited to specific exemplary embodiments described.

Figure 1A:
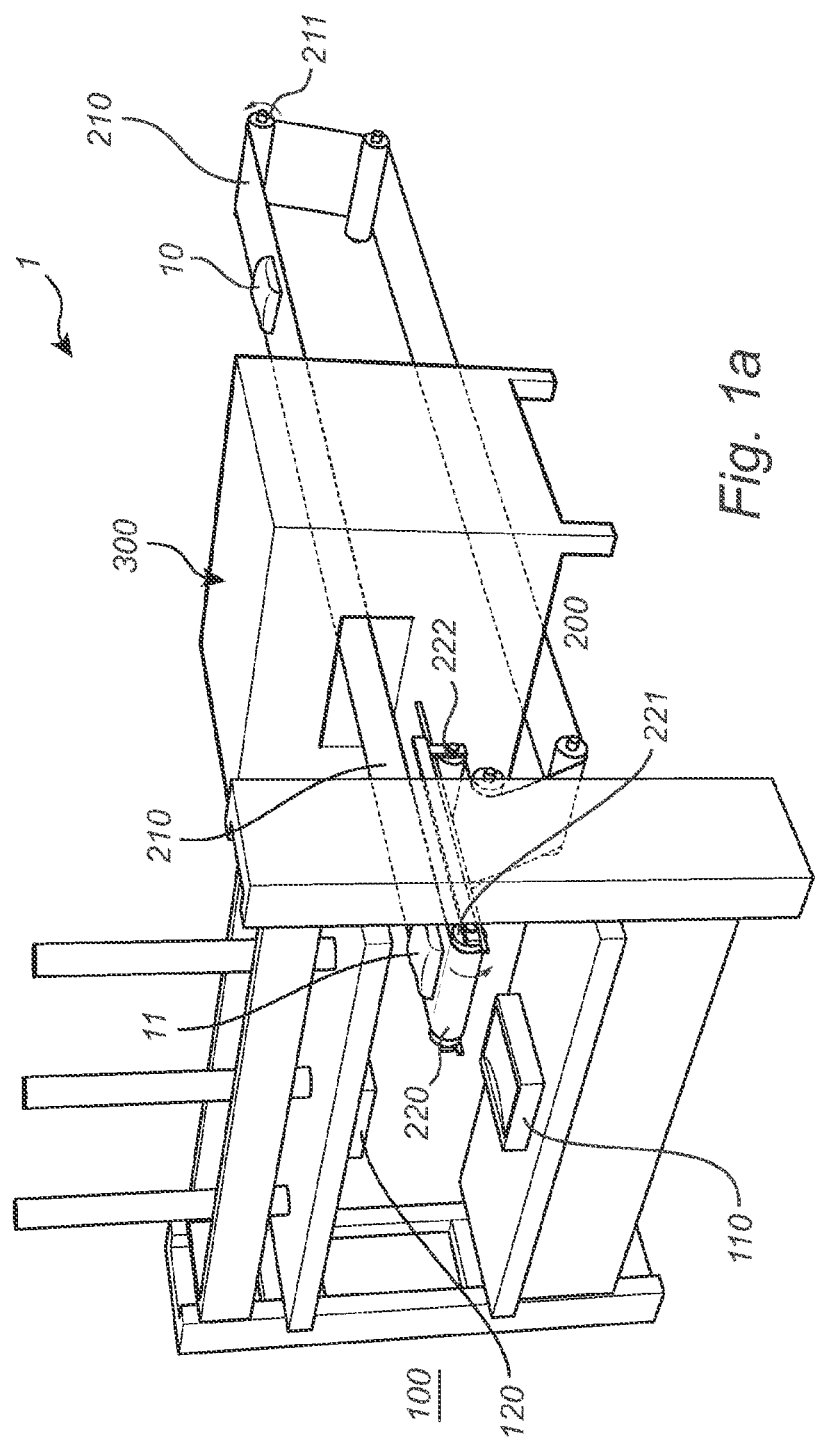
FIG. 1*a* is an overview of a fiber block molding apparatus according to an embodiment.
Figure 1B:
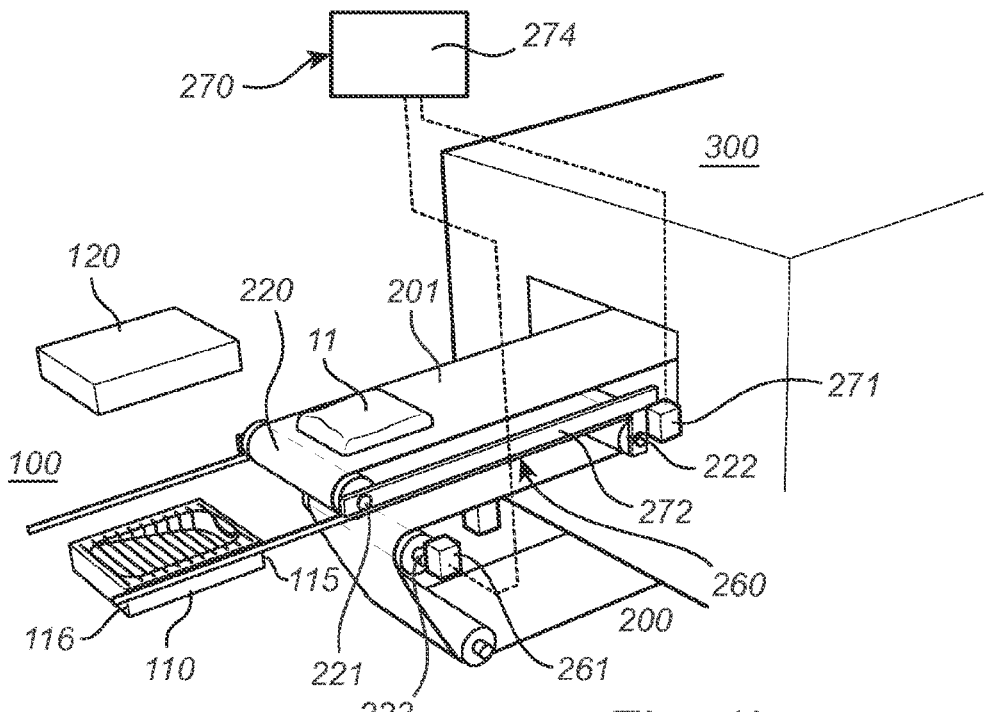
FIG. 1*b-f* is a sequence of figures depicting the laying of a heated fiber blank on the lower part of a mold by a fiber block molding apparatus according to the embodiment depicted in FIG. 1*a*.

In FIG. 1*a*, an overview of the fiber block molding apparatus 1 is provided. The apparatus 1 comprises a mold 100 for forming a heated fiber blank 11 into the molded article upon closing the mold 100. The mold has a lower part 110 and an upper part 120. Upon closing the mold the lower 110 and the upper 120 parts of the mold form between them a cavity 150. Further, the fiber block molding apparatus 1 comprises a conveyor system 200 with a receiving end and a delivery end 220. The delivery end 220 is arranged next to the mold 100. Further, the fiber block molding apparatus 1 comprises a heater 300, which may for example be an oven, for heating the fiber blank 10 before molding it to activate the binding agent. The receiving end and the delivery end 220 are arranged at opposite sides of the heater 300. A receiving position 210, at which receiving position 210 of the conveyor system 200 the fiber blank is positioned, is arranged between the heater 300 and the receiving end.

Figure 1C:
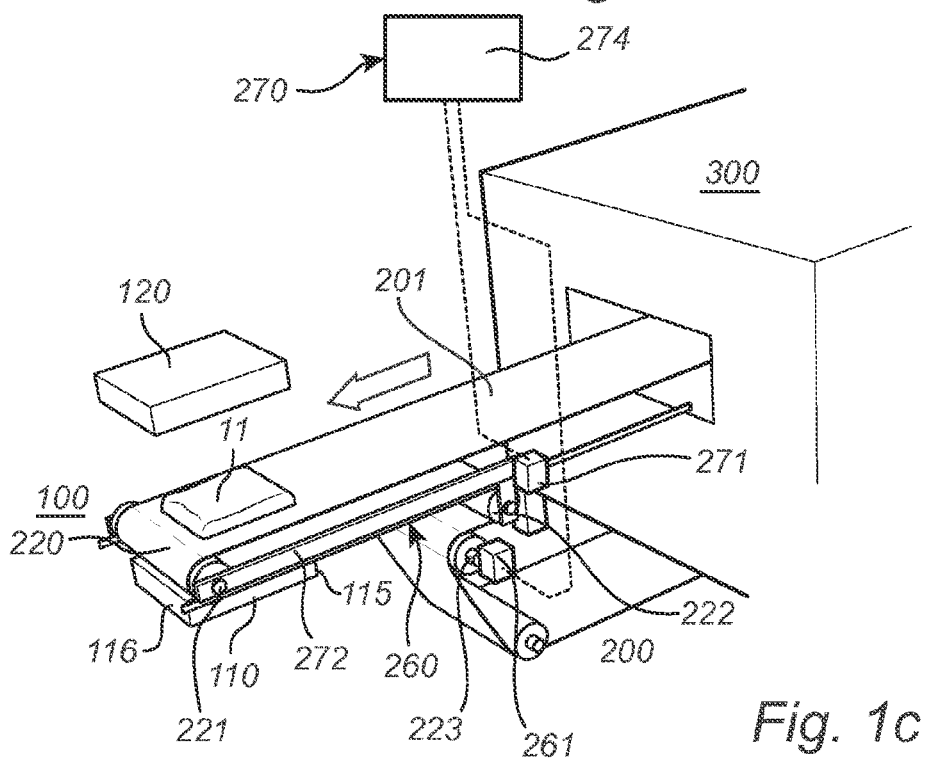
Figure 1D:
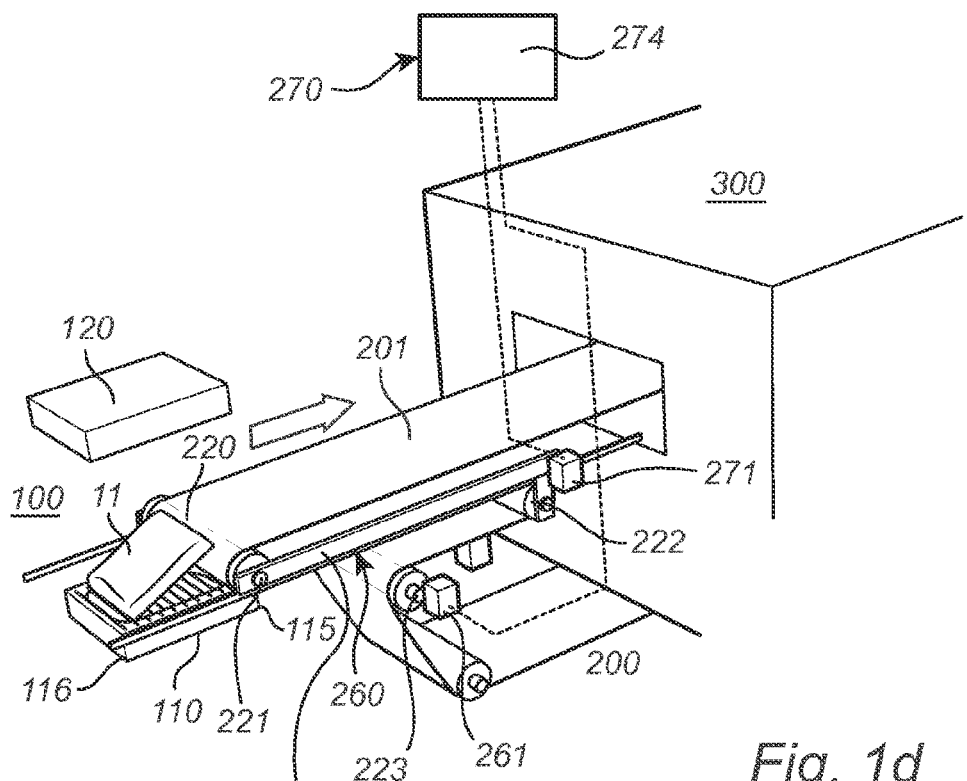
Figure 1E:
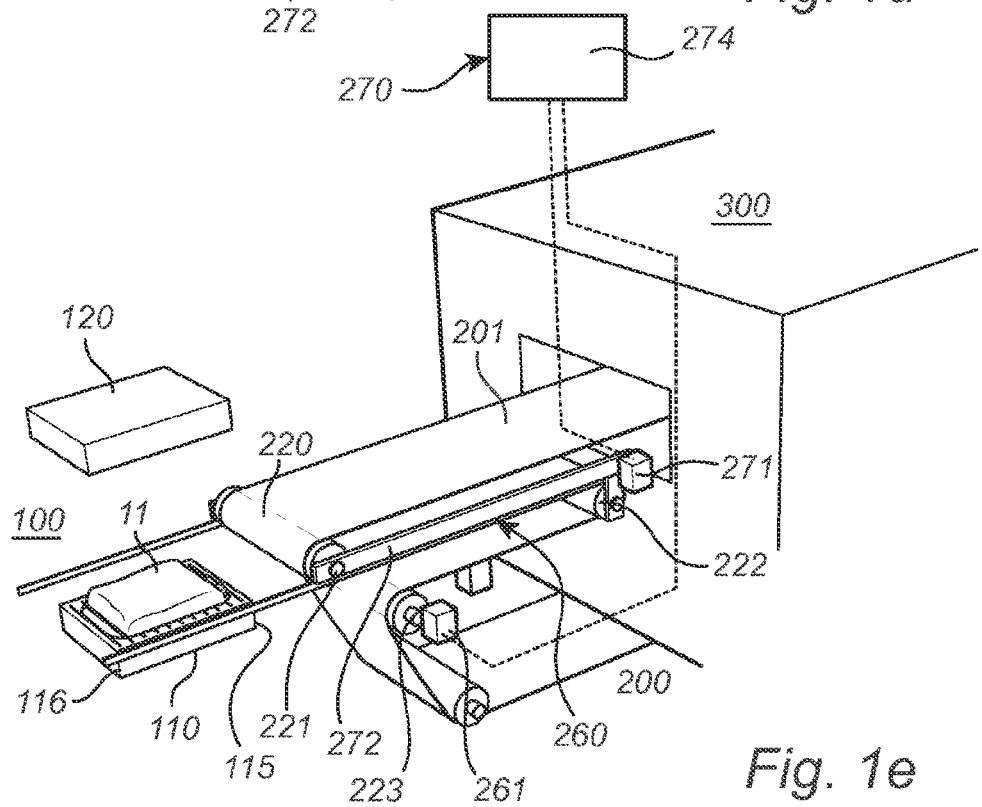

FIGS. 1*b* to 1*e* relate to an embodiment in which the conveyor system 200 comprises a conveyor belt 201 and a number of shafts over which the belt passes. At the delivery end 220, the belt 201 turns over a first turning shaft 221 and at the receiving end, the belt 201 turns over a second turning shaft 211 (see FIG. 1*a*). Further, the conveyor belt 201 passes over a stretching shaft 222 serving to keep the conveyor belt 201 stretched. The stretching shaft 222 is arranged between the delivery end 220 of the conveyor system 200 and the heater 300. The conveyor belt 201 is driven by a driver shaft 223 operated by a first electric motor 261. Further, the first turning shaft 221 and the stretching shaft 222 are connected by a slewing bracket 272, whereby the first turning shaft 221 may be shifted horizontally relative the conveyor system 200, whilst keeping the conveyor belt 201 stretched by displacing also the stretching shaft 222 horizontally. The slewing bracket 272 is operated by a second electric motor 271. The slewing bracket 272 and the stretching shaft 222 are included in a horizontal position shifting arrangement 260 which is arranged for shifting the horizontal position of the delivery end 220 of the conveyor system 200 relative to the lower part 110 of the mold 100 between a first position (FIG. 1*c*) and a second position (FIG. 1*e*). A fiber blank laying arrangement 270 comprises a conveyor control device 274, such as a programmable microprocessor, and controls the horizontal position shifting arrangement 260 and the first 261 and second 271 motors. The fiber blank laying arrangement 270 is arranged to coordinate the release of the heated fiber blank 11, i.e. feeding of the heated fiber blank 11 to the lower part 110 of the mold 100, from the conveyor system 200 at the delivery end 220 with the shifting of the delivery end 220 from the first position to the second position. Coordinating the release includes controlling the speed of the first electric motor 261 relative the speed of the second electric motor 271.

Figure 1F:
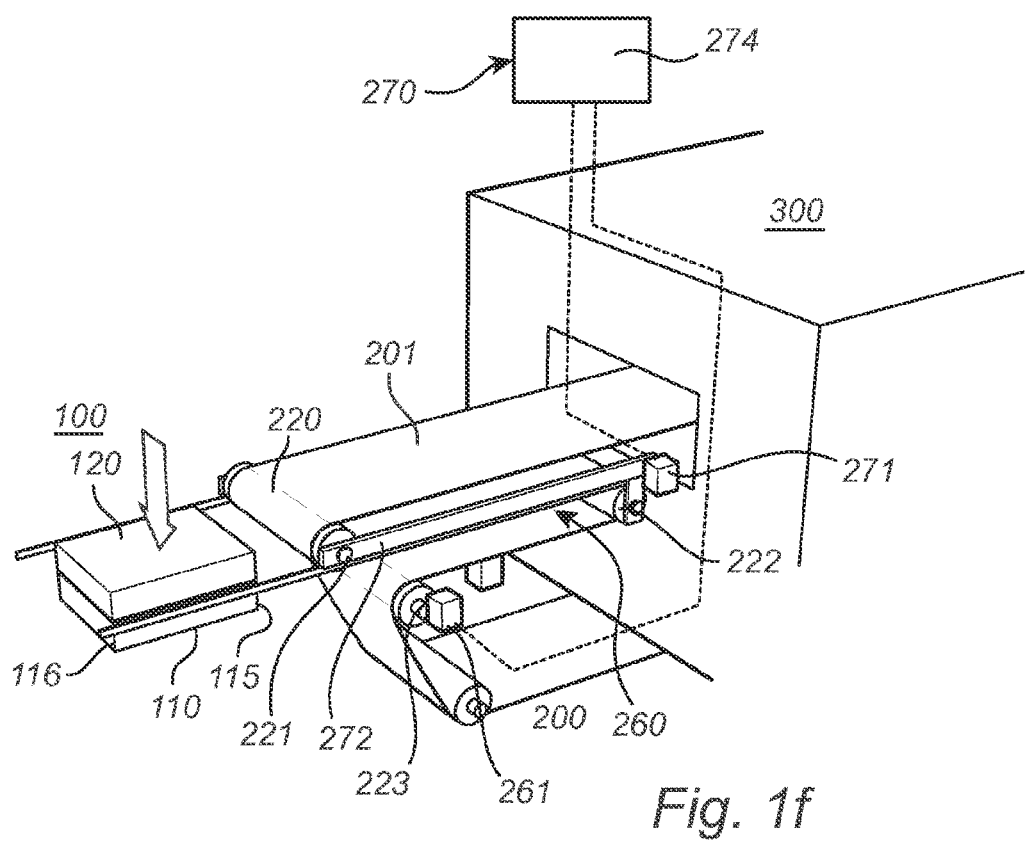

The laying of the heated fiber blank 11 on the lower part 110 of the mold 100 according to embodiments in which the horizontal position of the delivery end 220 of the conveyor system 200 relative to the lower part 110 of the mold 100 is shifted between a first and a second position is schematically depicted in FIGS. 1*b* to 1*f*. As can been seen the delivery end 220 is retracted in delivering the heated fiber blank 11 on the lower part 110 of the mold 100, such that the heated fiber blank 11 is laid on the lower part 110 of the mold 100. Hence, in FIG. 1*b* the heated fiber blank 11 has just left the heater 300 and rests on the conveyor belt 201. The mold 100 has just been opened after a previous sequence. In FIG. 1*c* the delivery end 220 has been moved, as illustrated by an arrow, to the first position in which the delivery end 220 is located between a distal end 116 and a proximal end 115 of the lower part 110 of the mold 100, but closer to the distal end (116). Such movement, including extension of the slewing bracket 272 away from the heater 330, is controlled by the fiber blank laying arrangement 270, illustrated in FIG. 1*b*, coordinating the action of the horizontal position shifting arrangement 260 and the first motor 261 driving the conveyor belt 201. In FIG. 1*d* the fiber blank laying arrangement 270 causes a withdrawal of the slewing bracket 272 towards the heater 300 to move the delivery end 220, as illustrated by an arrow, from the first position and towards a second position in which the delivery end 220 is located closer to the proximal end 115 than the distal end 116 of the lower part 110 of the mold 100 and not between the proximal end 115 and the distal end 116. The moving of the delivery end 220 from the first position towards the second position is coordinated with the first motor 261 driving the belt 201 causing the heated fiber blank 11 to be released from the belt 201 and laid onto the lower part 110 of the mold 100, as illustrated in FIG. 1d. In FIG. 1e the delivery end 220 has reached the second position. The heated fiber blank 11 rests on the lower part 110 of the mold 100. In FIG. 1f the mold 100 has been closed by the upper part 120 being moved vertically downwards to meet the lower part 110 to provide the heated fiber blank 11 with the desired shape. In addition, cooling of the fiber blank 11 occurs inside the mold 100 to solidify the fiber blank into the fiber block article.

Figure 2A:
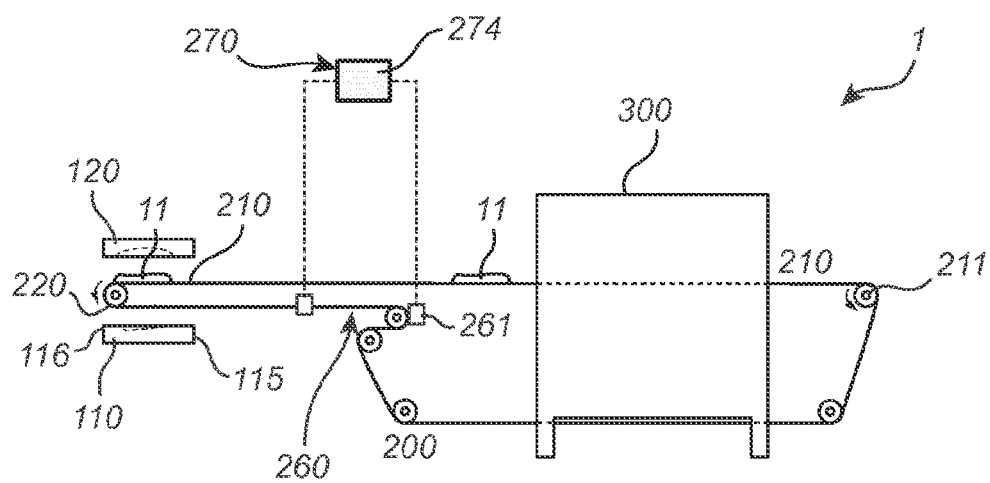
FIG. 2*a-b* depicts a cross-section of a fiber block molding apparatus according to an embodiment.
Figure 2B:
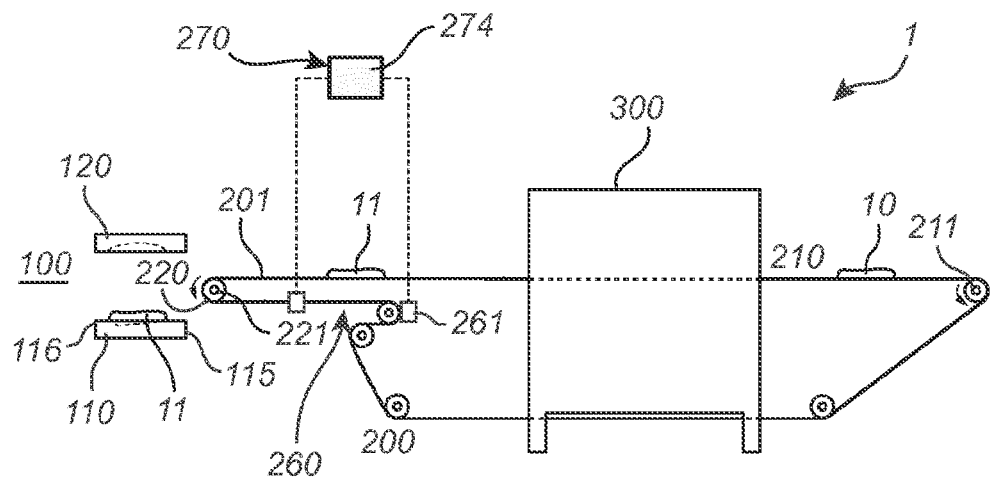

FIGS. 2a to 2b relate to an embodiment which has similarities to the one of FIGS. 1a to 1f, but in which also the second turning shaft 211 is displaced horizontally in delivering the heated fiber blank 11 to the lower part 110 of the mold 100. The conveyor belt 201 is kept stretched by displacing the second turning shaft 211 in co-ordination with the horizontal displacement of the first turning shaft 221. In FIG. 2a the fiber block molding apparatus 1 is depicted in the first position, in which the delivery end 220 of the conveyor system 200 is located between the distal end 116 and the proximal end 115 of the lower part 110 of the mold 100, but closer to the distal end 116, whereas the fiber block molding apparatus 1 in FIG. 2b is depicted in the second position, in which the delivery end 220 of the conveyor system 200 is, in the second position, located closer to the proximal end 115 than to the distal end 116 of the lower part 110 of the mold 100 but not between the proximal end 115 and the distal end 116. As can be seen, the relative position of the turning shafts 211 and 221 are different in FIG. 2a and FIG. 2b, respectively, and these two turning shafts 211, 221 and arrangements (not completely shown in FIGS. 2a-2b, but optionally similar to the slewing bracket 272 illustrated in FIG. 1b) for moving them in a horizontal direction form part of a horizontal position shifting arrangement 260. A fiber blank laying arrangement 270 is arranged for coordinating the action of the horizontal position shifting arrangement 260 and the first motor 261 driving the conveyor belt 201 to accommodate the laying of a heated fiber blank 11 on the lower part 110 of the mold 100 according to principles similar to that of FIGS. 1b-1e.

FIGS. 3a to 3b relate to an embodiment in which the conveyor system 200 comprises a conveyor belt 201 and a conveyor shuttle 250. The conveyor belt 201 receives, at a receiving position 210, the fiber blank 10 to be molded and transports the fiber blank through an oven serving as heater 300. After having passed through the oven, the conveyor belt 201 delivers the heated fiber blank 11 to the conveyor shuttle 250. After having received the heated fiber blank 11, the conveyor shuttle 250 is displaced to a first position (cf. FIG. 3a) in which the delivery end 220 of the conveyor system 200 is located between the distal end 116 and the proximal end 115 of the lower part 110 of the mold 100 but closer to the distal end 116. Thereafter, the horizontal position of the delivery end 220 is shifted by means of a horizontal position shifting arrangement 260 displacing the conveyor shuttle 250 to the second position (cf. FIG. 3b), in which position the delivery end 220 of the conveyor system 200 is located closer to the proximal end 115 than to the distal end 116 of the lower part 110 of the mold 100, but not between the proximal end 115 and the distal end 116. A fiber blank laying arrangement 270 is arranged for coordinating the action of the horizontal position shifting arrangement 260 controlling the position of the conveyor shuttle 250 by means of a second motor 271 with the speed of a first motor 261 driving the belt 202 of the conveyor shuttle 250 to accommodate the laying of a heated fiber blank 11 on the lower part 110 of the mold 100. By shifting the horizontal position of the delivery end 220 by displacing the conveyor shuttle 250 whilst feeding the heated fiber blank 11 to the lower part 110 of the mold 100, the heated fiber blank 11 is laid on the lower part 110 of the mold 100 in a similar manner as described hereinbefore with reference to FIGS. 1b-1e.

Figure 4A:
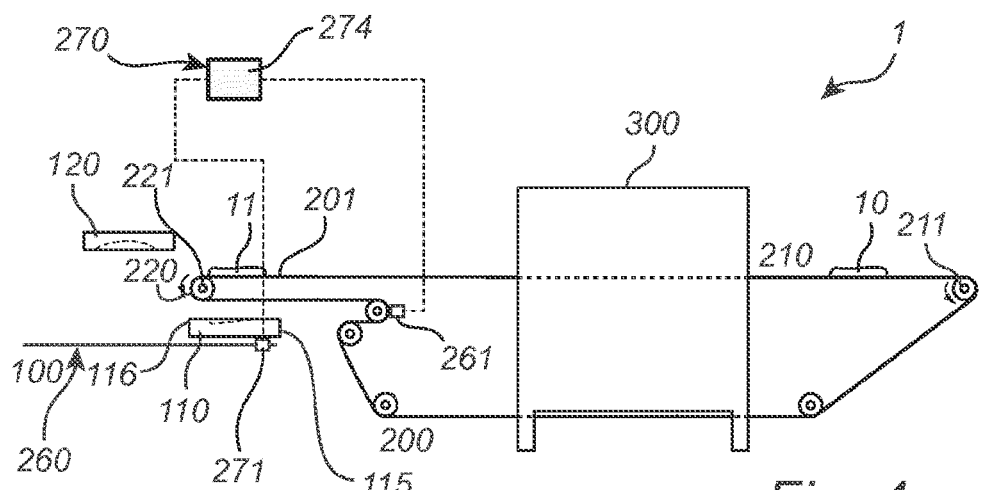
FIG. 4*a-b* depicts a cross-section of a fiber block molding apparatus according to an embodiment.
Figure 4B:
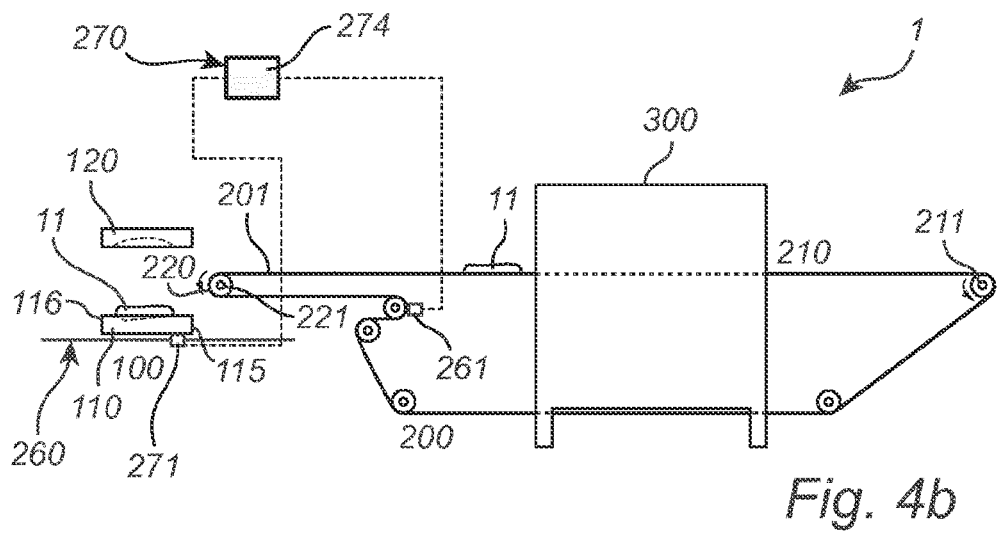

In the embodiment of FIGS. 4a and 4b, the lower part 110 of the mold 100 is shifted between a first position (cf. FIG. 4a) and a second position (cf. FIG. 4b), whereas the delivery end 220 of the conveyor system 200 not is displaced. Hence, there is still relative movement between the delivery end 220 of the conveyor system 200 on the one hand and the distal end 116 and the proximal end 115 of the lower part 110 of the mold 100 on the other hand between first and second positions similar to the first and second positions described hereinbefore with reference to, e.g., FIGS. 1b-1e. The horizontal position of the lower part 110 of the mold 100 relative to the delivery end 220 of the conveyor system 220 is shifted by means of a horizontal position shifting arrangement 260 comprising a second motor 271 controlling the horizontal position of the lower part 110. A fiber blank laying arrangement 270 is arranged for coordinating the action of the horizontal position shifting arrangement 260 and the first motor 261 driving the conveyor belt 201 to accommodate the laying of a heated fiber blank 11 on the lower part 110 of the mold 100 according to the principles of FIGS. 1b-1e.

Figure 5A:
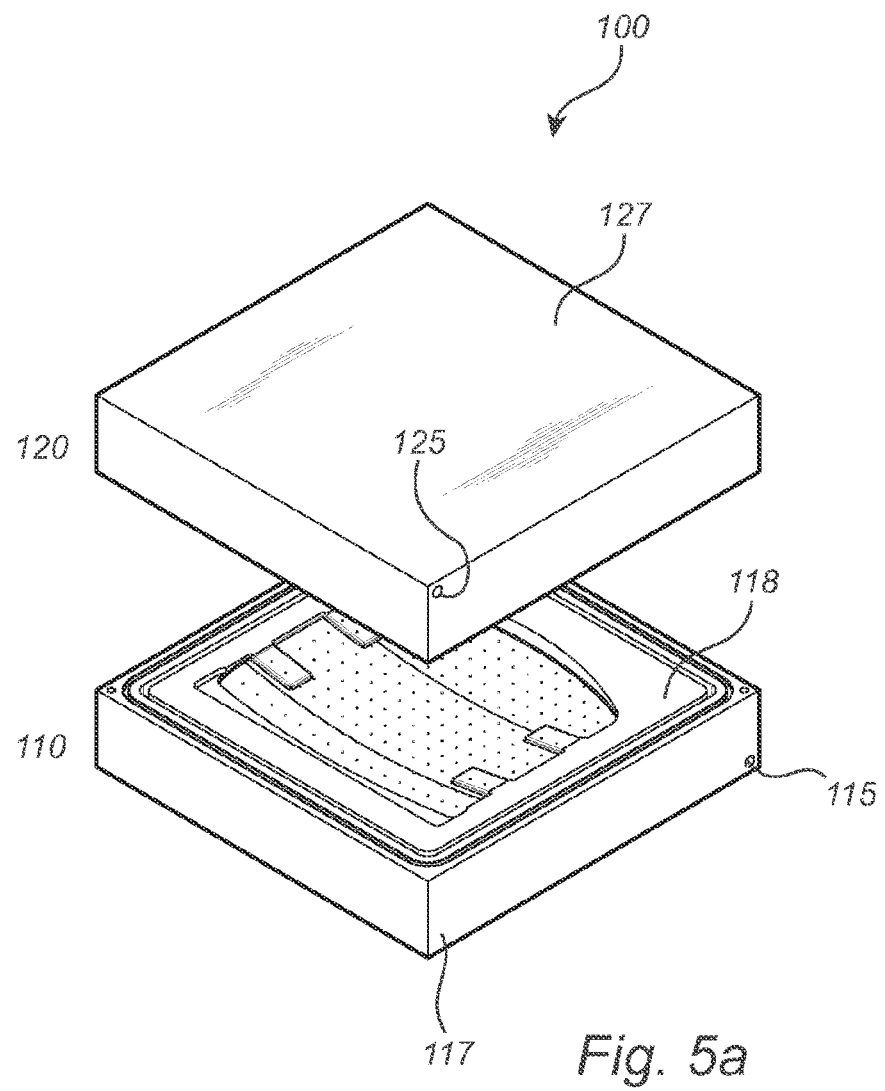
FIG. 5*a-d* depicts a mold according to an embodiment.
Figure 5B:
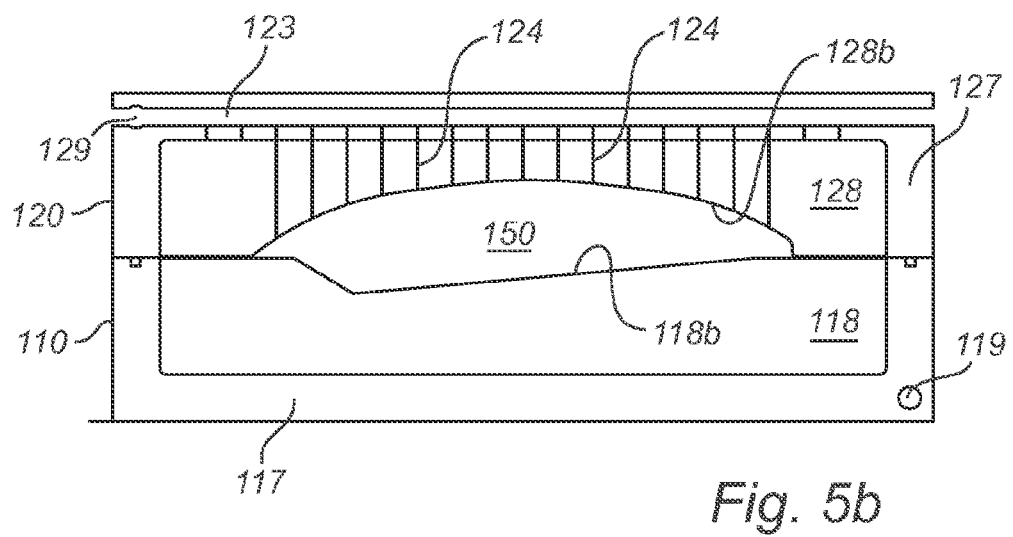
Figure 5C:
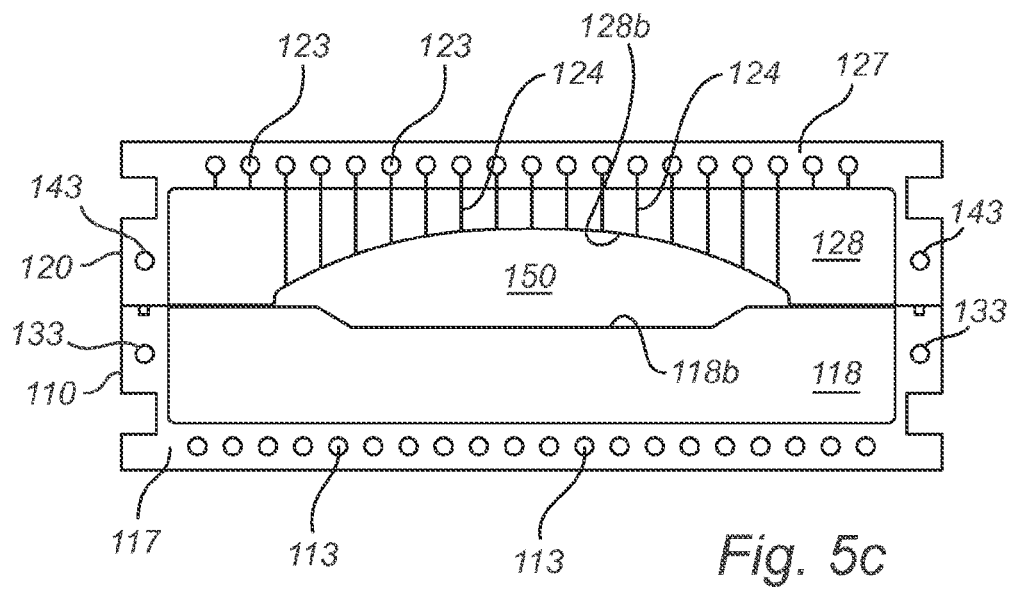
Figure 5D:
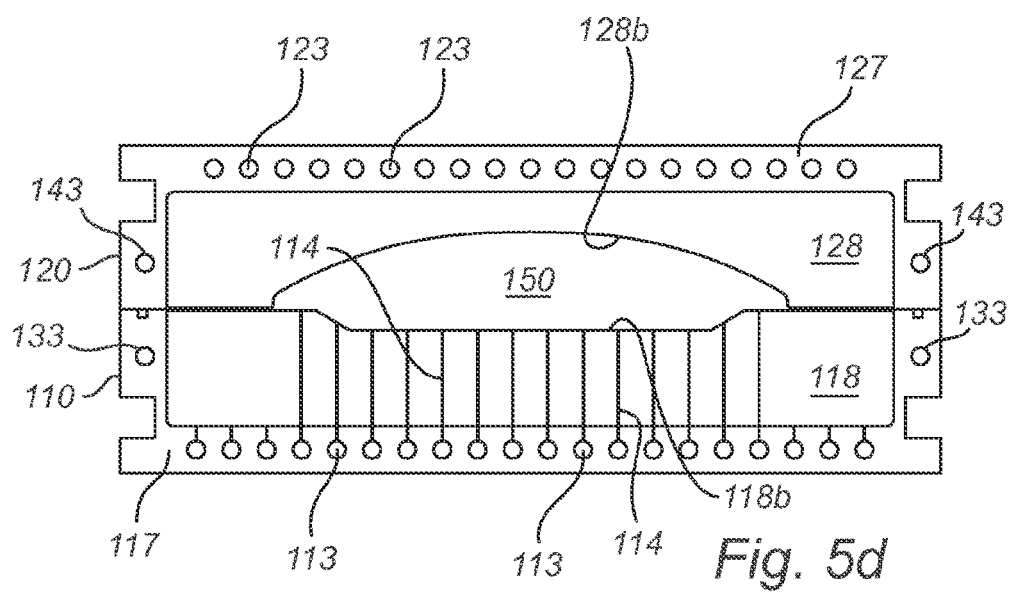

In FIG. 5a, a mold 100 according to an embodiment is provided. FIGS. 5b and 5c are two perpendicular cross-sections of FIG. 5a. FIG. 5d is another cross-section of FIG. 5a, the cross-section perspective in FIG. 5d being parallel to the one in FIG. 5c. The mold 100 has a lower part 110 and an upper part 120. Further, the lower part 110 of the mold comprises a first main part 117 and a first replaceable insert part 118. The first insert part 118 having a surface structure 118b, which in this embodiment is an indentation, defining the lower part of the cavity 150 of the mold 100. Similarly, the upper part 120 of the mold comprises a second main part 127 and a second replaceable insert part 128. The second insert part 128 has a surface structure, such as an indentation 128b, defining the upper part of the cavity 150 of the mold 100. It will be understood that one of the insert parts 118, 128 could, in alternative embodiments, be provided with an indentation and one could be provided with a protrusion, or one or both of the two insert parts 118, 128 could be provided with both indentation(-s) and protrusion(-s) as long as a cavity 150 still is formed upon closing the mold.

The first main part 117 is provided with a connection port 115 for a cooling fluid. Further, the first main part 117 is provided with a first number of channels 113 arranged parallel with respect to each other in the plane of the lower part 110 of the mold 100. The first number of channels 113 are connected to the connection port 115 by a connection channel 119, running at one side of the lower part 110 of the mold perpendicular to the first number of channels 113, but in the same plane, and connecting each of the channels in the first number of channels 113 to the connection port 115. Further, the first number of channels 113 is connected to second number of channels 114. The second number of channels 114 are arranged perpendicular to the plane of the lower part 110 of the mold and run via the first replaceable insert part 118 into the indentation defining the lower part of the cavity 150 of the mold 100.

Similarly, the second main part 127 is provided with a connection port 125 for a cooling fluid. Further, the second main part 127 is provided with a third number of channels 123 arranged parallel with respect to each other in the plane of the upper part 120 of the mold 100. The third number of channels 123 is connected to the connection port 125 by a connection channel 129, running at one side of the upper part 120 of the mold 100, perpendicular to the third number of channels 123, but in the same plane, and connecting each of the channels in the third number of channels 123 to the connection port 125. Further, the third number of channels 123 is connected to a fourth number of channels 124. The fourth number of channels 124 is arranged perpendicular to the plane of the upper part 120 of the mold 100 and runs via the second replaceable insert part 128 into the indentation defining the upper part of the cavity 150 of the mold 100.

Cooling fluid, which may for example be cooling air or cooling water, may, after the mold 100 has been closed to enclose a heated fiber block 11 (cf. FIG. 1f) inside the cavity 150 of the mold be supplied to the connection port 115. The connection port 115 distributes the cooling fluid between the first number of channels 113, and the first number of channels 113 distributes the cooling fluid further to the second number of channels 114. The second number of channels 114 distributes the cooling fluid into the heated fiber block located inside the cavity 150 and causes cooling of the heated fiber block such that the fiber block solidifies, having the shape of the cavity 150. The cooling fluid passes, after having passed through the cavity 150, into the fourth number of channels 124 of the second insert part 128 and from there further to the third number of channels 123. Finally, the spent cooling fluid, which at this point has a higher temperature, passes from the third number of channels 123 into the connection port 125 and then leaves the mold 100. Preferably, the second number of channels 114 orifices, i.e. the openings of the second number of channels 114 into the cavity, is displaced relative to the fourth number of channels 124 orifices, i.e. the openings of the fourth numbers of channels 124 into the cavity 150. Thereby, the cooling fluid, such as the cooling air, will not flow vertically through the cavity 150, but will flow slightly sideways, thereby improving the cooling effect.

Optionally, and as illustrated in FIGS. 5c and 5d, the lower part 110 of the mold 100 may be provided with another set of channels 133 for a cooling liquid, said another set of channels 133 not being in flow communication with the cavity 150. The cooling liquid, which could, for example, be water or oil, transported in the channels 133 makes it easier to maintain an even and constant temperature of the mold 100. As alternative to, or in combination with, the set of channels 133 for the cooling liquid of the lower part 110 of the mold 100, the upper part 120 of the mold 100 may be provided with still another set of channels 143 for a cooling liquid, the another set of channels 143 not being in flow communication with the cavity 150. Thereby a more even temperature of the upper part 120 of the mold 100 may be achieved.

Without further elaboration, it is believed that one skilled in the art may, using the preceding description, utilize the present invention to its fullest extent. The preceding preferred specific embodiments are, therefore, to be construed as merely illustrative and not limitative of the disclosure in any way whatsoever.

Although the present invention has been described above with reference to specific embodiments, it is not intended to be limited to the specific form set forth herein. Rather, the invention is limited only by the accompanying claims and other embodiments than the specific embodiments described above are equally possible within the scope of these appended claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc. do not preclude a plurality.

The invention claimed is:

1. A three-dimensional fiber block article, the three-dimensional fiber block article being obtainable by molding a heated fiber blank, including a thermally activated binding agent, into the three-dimensional fiber block article in a fiber block molding process, the fiber block molding process comprising:
   receiving the fiber blank to be molded at a receiving position of a conveyor system;
   transporting the fiber blank by means of the conveyor system via a heater, thereby heating the fiber blank to activate the binding agent, to a mold, the mold having a lower part and an upper part, wherein the lower and the upper parts of the mold form between them a cavity for forming the fiber blank into the fiber block article upon closing the mold;
   cooling the lower part of the mold;
   delivering the heated fiber blank on the cooled lower part of the mold; and
   closing the mold to provide the fiber block article;
   wherein the cavity is closed on only a single heated fiber blank, such that the fiber block article is of a unitary, one-piece construction;
   wherein the fiber blank is lapped vertically, the fibers in the fiber blank being arranged perpendicularly to the longitudinal extension of the fiber blank, and/or the fibers in the fiber blank being arranged perpendicularly to the transport direction of the fiber blank on the conveyor system;
   wherein the fiber block article has an outer surface with stronger bonded fibers compared to fibers in an interior of the fiber block article;
   wherein the fiber block article is a cushion member; and
   wherein the fiber block article includes binder fibers and filling fibers, the binder fibers being distinct from the filling fibers, wherein the binder fibers are bi-component binder polyester fibers that include the thermally activated binding agent, wherein the filling fibers are polyester fibers.

2. The three-dimensional fiber block article according to claim 1, wherein the cushion member is a cushion member for a seat or a back rest of a sofa or a chair.

3. The three-dimensional fiber block article according to claim 2, wherein the three-dimensional fiber block article is a seat cushion for a chair, the fibers being arranged standing in the seat cushion.

4. The three-dimensional fiber block article according to claim 1,
   wherein the thermally activated binding agent has an activation temperature of 100 to 160° C., being lower than the melting point of the polyester fibers.

5. The three-dimensional fiber block article according to claim 1, wherein the fiber blank comprises 10 to 80 wt % bi-component binder polyester fibers.

6. The three-dimensional fiber block article according to claim 5, wherein the fiber blank comprises 20 to 60 wt % bi-component binder polyester fibers.

7. The three-dimensional fiber block article according to claim 1, wherein the bi-component binder polyester fibers are core-sheath binder polyester fibers; and
   wherein the sheath constitutes the thermally activated binding agent.

8. The three-dimensional fiber block article according to 1, wherein the fiber blank is received in the form of a sheet at the receiving position; and wherein the received sheet once heated is molded into the molded fiber block article.

9. The three-dimensional fiber block article according to claim 1, wherein heated air is pushed through the fiber blank in the step of transporting the fiber blank via the heater, the heated air having a temperature of 120 to 220° C.

10. The three-dimensional fiber block article according to claim 1, wherein the molded fiber block article is cooled by pushing a cooling fluid through it once the mold has been closed.

11. The three-dimensional fiber block article according to claim 10, wherein the cooling fluid is air.

12. The three-dimensional fiber block article according to claim 1, wherein a delivery end of the conveyor system is arranged on a vertically higher level than the lower part of the mold in laying the heated fiber blank on the lower part of the mold; and wherein the horizontal position of the delivery end of the conveyor system relative the lower part of the mold is shifted from a first position, in which the delivery end of the conveyor system is arranged in an area between a distal end and a proximal end of the lower part of the mold, to a second position, in which the delivery end of the conveyor system is arranged closer to the proximal end than the distal end of the lower part of the mold and outside of the area between the distal end and the proximal end, whilst feeding the heated fiber blank to the lower part of the mold, the feeding being coordinated with the shifting from the first to the second position such that the heated fiber blank is laid on the lower part of the mold.

13. The three-dimensional fiber block article according to claim 12, wherein a feeding rate and a shifting rate are the same.

14. The three-dimensional fiber block article according to claim 12, wherein the horizontal position of the delivery end of the conveyor system relative the horizontal position of the lower part of the mold is shifted by horizontally shifting the delivery end of the conveyor system, whilst laying the heated fiber blank on the lower part of the mold.

15. The three-dimensional fiber block article according to claim 1, wherein the fiber blank comprises 20 to 60 wt % of the bi-component binder polyester fibers.

16. The three-dimensional fiber block article according to claim 1, wherein the bi-component binder polyester fibers are core-sheath binder polyester fibers, the sheath constituting the thermally activated binding agent, and wherein the fiber blank comprises 20 to 60 wt % of the bi-component binder polyester fibers.

17. A three-dimensional fiber block article, the three-dimensional fiber block article being obtainable by molding a heated fiber blank, including binder fibers and filling fibers, the binder fibers being distinct from the filling fibers, the binder fibers being thermally activated bi-component binder polyester fibers, and the filling fibers being polyester fibers, into the three-dimensional fiber block article in a fiber block molding process, the fiber block molding process comprising:

receiving the fiber blank to be molded at a receiving position of a conveyor system;

transporting the fiber blank by means of the conveyor system via a heater, thereby heating the fiber blank to activate the binding agent, to a mold, the mold having a lower part, an upper part, and mold surfaces, wherein the lower and the upper parts of the mold form between them a cavity for forming the fiber blank into the fiber block article upon closing the mold;

delivering the heated fiber blank on the lower part of the mold, the temperature of the mold and the mold surfaces being lower than an activation temperature of the binding agent; and closing the mold to provide the fiber block article;

wherein the cavity is closed on only a single heated fiber blank, such that the fiber block article is of a unitary, one-piece construction;

wherein the fiber blank is lapped vertically, the fibers in the fiber blank being arranged perpendicularly to the longitudinal extension of the fiber blank, and/or the fibers in the fiber blank being arranged perpendicularly to the transport direction of the fiber blank on the conveyor system;

wherein the fiber block article has an outer surface with stronger bonded fibers compared to fibers in an interior of the fiber block article; and wherein the fiber block article is a cushion member.

18. The three-dimensional fiber block article according to claim 17, wherein the bi-component binder polyester fibers are core-sheath binder polyester fibers, the sheath constituting a thermally activated binding agent; and wherein the fiber blank comprises 20 to 60 wt % of the bi-component binder polyester fibers.

* * * * *